(No Model.) 4 Sheets—Sheet 1.
W. L. VAN HARLINGEN, Sr., & W. L. VAN HARLINGEN, Jr.
HEATING PIPE CONNECTION BETWEEN CARS.
No. 372,946. Patented Nov. 8, 1887.
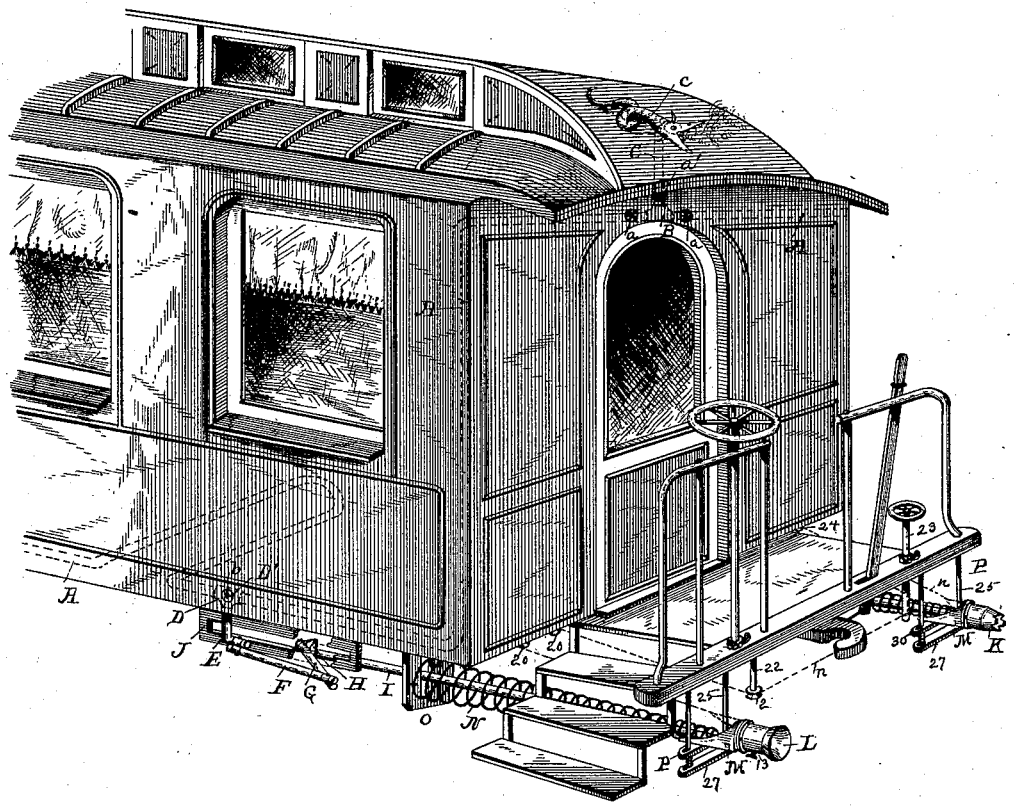
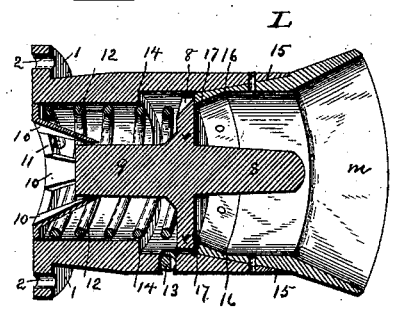
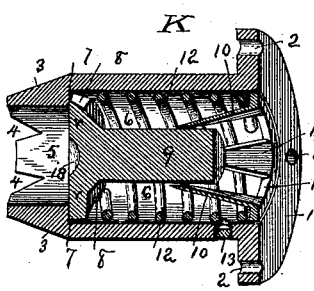

(No Model.) 4 Sheets—Sheet 2.
W. L. VAN HARLINGEN, Sr., & W. L. VAN HARLINGEN, Jr.
HEATING PIPE CONNECTION BETWEEN CARS.
No. 372,946. Patented Nov. 8, 1887.
Fig-4-
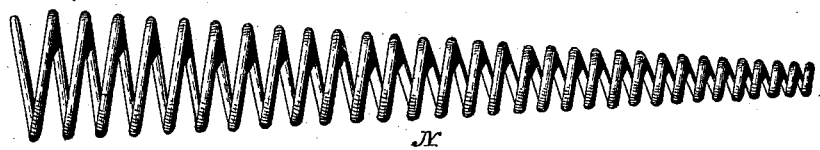
Fig-6-
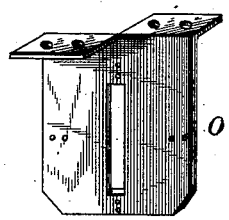
Fig-5-
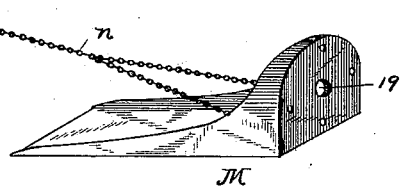
Fig-8-
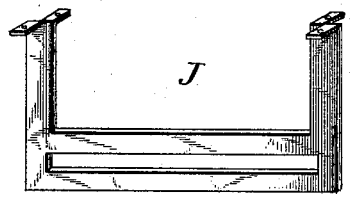
Fig-7-
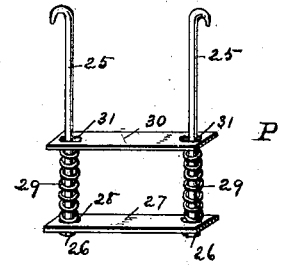
Witnesses
Albert Speiden
D. B. Gallatin
Inventors
W<sup>m</sup> L. Van Harlingen, Sr.
W<sup>m</sup> L. Van Harlingen, Jr.
By their Attorney
W<sup>m</sup> Hunter Myers (No Model.) 4 Sheets—Sheet 3.

W. L. VAN HARLINGEN, Sr., & W. L. VAN HARLINGEN, Jr.
HEATING PIPE CONNECTION BETWEEN CARS.

No. 372,946. Patented Nov. 8, 1887.

Witnesses  Inventors
Albert Spuiden  Wm L Van Harlingen, Sr.
D. W. Gallatin  Wm L Van Harlingen, Jr.
By their Attorney
Wm Hunter Myers N. PETERS, Photo-Lithographer, Washington, D. C.

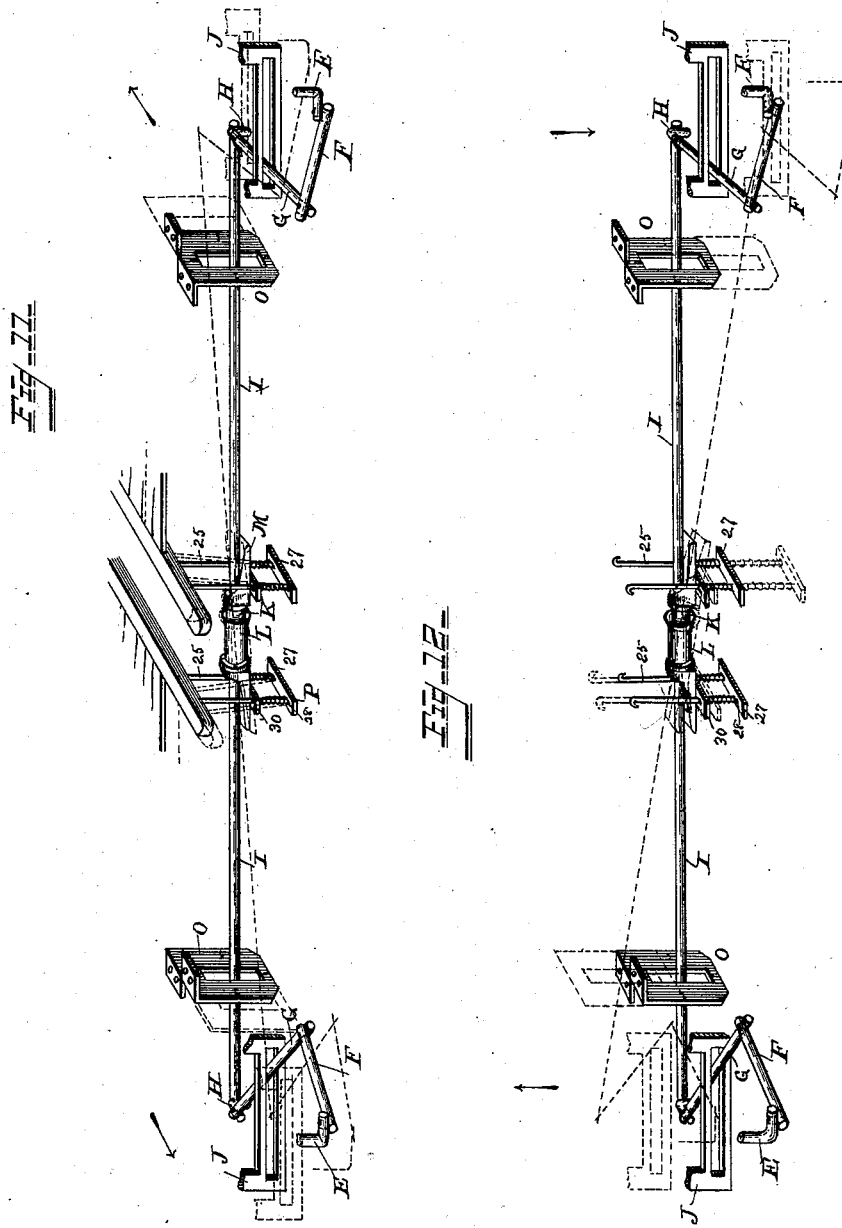

UNITED STATES PATENT OFFICE.

WILLIAM L. VAN HARLINGEN, SR., AND WILLIAM L. VAN HARLINGEN, JR., OF SAN FRANCISCO, CALIFORNIA.

HEATING-PIPE CONNECTION BETWEEN CARS.

SPECIFICATION forming part of Letters Patent No. 372,946, dated November 8, 1887.

Application filed May 31, 1887. Serial No. 239,744. (No model.)

*To all whom it may concern:*

Be it known that we, WILLIAM L. VAN HARLINGEN, Sr., and WILLIAM L. VAN HARLINGEN, Jr., citizens of the United States of America, residing at San Francisco, in the county of San Francisco and State of California, have invented certain new and useful Improvements in Heating-Pipe Connections between Cars, of which the following is a specification, reference being had therein to the accompanying drawings.

Our invention appertains to heating-pipe connections between cars, and has for its object to provide means for conveying hot air or steam derived from any suitable source through all the cars of a train for the purpose of heating them, the construction and arrangement of the pipes and pipe-couplings and their appendages being such that communication between the pipes of the cars may be established by the simple act of bringing the cars together, when the pipe-couplings will be held in contact with each other by spring-pressure alone, no hooks, levers, or other devices being employed to secure them together; and, furthermore, when the cars are separated the valves in each coupling will automatically close and shut off the flow of the heating agent.

The invention will first be described in connection with the accompanying drawings, and then pointed out in the claims.

Figures 9, 10:
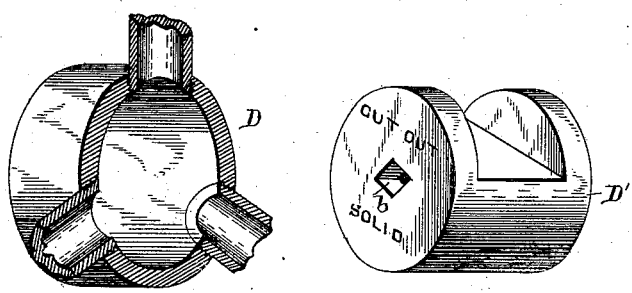
Figure 13:
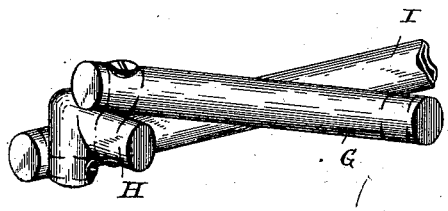
Figure 14:
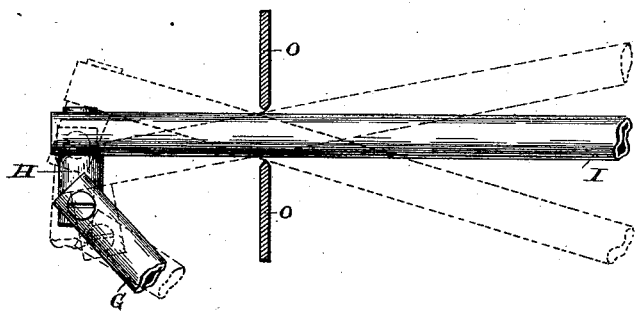

Figure 1 is a perspective view of so much of a car-body and its appliances as is necessary to illustrate our invention. Figs. 2 and 3 are sectional perspective views of the female and male pipe-couplings, respectively. Fig. 4 is a side view of one of the propelling-springs for the pipe-couplings. Fig. 5 is a perspective view of a sliding box for supporting one end of the conducting-pipe and the propelling-spring, and to which the pipe-coupling is secured. Fig. 6 is a perspective view of a slotted base-plate for the propelling-spring, and which also serves as a guide for the conducting-pipe. Fig. 7 is a perspective view of a spring-seat for the sliding box. Fig. 8 is a perspective view of a horizontal guide for one of the jointed sections of the conducting-pipe. Figs. 9 and 10 are perspective views of a three-way pipe-joint and its valve. Figs. 11 and 12 are diagrams illustrating the positions assumed by the pipes during lateral and vertical oscillations of one car with respect to another. Fig. 13 is a perspective view of the elbow-pipe with portions of one of the section-pipes and the conducting-pipe jointed thereto. Fig. 14 is a plan view of the same, the conducting-pipe passing through the slotted plate, which is shown in section, illustrating the manner in which strain on the joints is avoided.

Referring to the drawings, A represents the main pipes, (only one of which is seen in the drawings,) which extend along the sides of the car, inside, near the floor, with a return-bend under each seat, in the usual manner. At each end of the car these pipes are bent upward to near the roof, thence across to the center of the car, where their ends connect with a three-way joint, B, to which is also connected a vertical escape-pipe, C, bearing upon its upper end any suitable ornamental figure, as a dragon, *c*, the pipes A and C being each provided with an ordinary valve, *a a'*.

In each main pipe A, near each end of the car, is inserted another three-way joint, D, precisely similar to joint B, into which is fitted a valve, D', of the form shown in Fig. 10, which has a square socket, *b*, formed in its outer end for the reception of a suitable operating-key, the socketed end of the valve extending outward flush with the outer side of the car, so as to be readily accessible.

Into the three-way joint D is screwed one end of a short pipe-section, E, and F and G are also pipe-sections, jointed together and to section E after the manner of gas-fixtures, as seen in Fig. 1. One of these pipe-sections, G, is likewise jointed to one arm of a short elbow-pipe, H, to the other arm of which is jointed the rear end of the conducting-pipe I, as clearly shown in Fig. 13.

J represents a slotted guide-plate, attached longitudinally to the bottom of the car through the slot in which pipe-section G passes. This section is not only supported by the guide-plate, but it is also prevented from being tilted up and down (with a tendency to loosen the joints) by the vertical movements of the conducting-pipe I, which pipe, as section G cannot be tilted, is made to turn at its joint on the elbow.

K and L are the pipe-couplings, of which the former is the male and the latter the female. The male coupling K is a round hollow casting, of any suitable metal, having a base flange, 1, in which are formed bolt-holes 2. The forward end of this coupling is beveled, as seen at 3, and is notched, as seen at 4. The interior diameter of the greater portion of this coupling is greater than that of the mouth 5, in order to form a chamber, 6, for the valve and its operating mechanism, and consequently there is an offset on the line where the mouth opens into the chamber, which offset serves as a seat, 7, for the valve $v$. This valve is a casting of a diameter to neatly fit in the chamber 6, having notches 8 in its periphery, these notches increasing in size from front to rear, as seen in Fig. 3. The valve has an integrally-formed guide-stem, 9, which extends rearwardly and is guided by braces 10, attached to an annular ring, 11, at the rear end of chamber 6. One end of a coil-spring, 12, which encircles the guide-stem, rests against this ring, and its other end rests against the rear side of the valve. The coupling is provided with a cock, 13, for drawing off any condensation that might accumulate in it.

L represents the female coupling, of sufficient interior diameter to admit the male coupling. The interior diameter is reduced, however, at 14, to form a shoulder for arresting the rearward movement of its valve, for a purpose hereinafter stated, and the forward end of this coupling is beveled outwardly on the inner side, as at 15, for the reception of a flaring mouth-piece, $m$, preferably of a softer material than the male coupling, the mouth-piece being beveled on its outer side to correspond with the bevel on the inner side of its coupling, and is secured in the coupling by rivets or in other suitable manner. The inner diameter of the mouth-piece is gradually reduced from the point marked 16 to its inner end, 17, which end serves as a seat for the valve. This female coupling is provided with an annular ring, 11, carrying braces 10 and a coil-spring, 12, all as described for the male coupling. The valve $v$ is also of the same construction as the valve in the male coupling, except that it has a forwardly-extending operating-stem, $s$, which, together with guide-stem 9, is formed integral with the valve. The forward end of stem $s$ is preferably rounded in order to enter a concavity, 18, formed in the front face of the valve in the male coupling when the two couplings are brought together.

The inner end of the conducting-pipe I is jointed to the elbow-pipe H, and the outer end is screwed into an opening, 19, in the forward end of a sliding metal box, M, shaped as shown in Fig. 5. To the front wall of this box is bolted the pipe-coupling, and to the rear part is attached a chain, $n$, which extends rearward and passes around two pulleys, 20, secured to the under side of the end of the car-body, one of which is in direct line with the sliding box M, thence forward to a pulley, 21, journaled on a rod, 22, attached to the under side of the platform-beam, thence across the car, underneath the car-coupling, to a winding-shaft, 23, to which it is secured, the winding-shaft passing through the platform-beam and provided with the usual hand-wheel and a pawl and ratchet. Another chain $n$ passes rearward from the sliding box on the opposite side of the car and passes around a pulley, 24, in line with the box, thence forward to the winding-shaft, to which it is secured.

N represents a long tapering coil propelling-spring surrounding the conducting-pipe I, the rear or large end of which is secured to a vertically-slotted guide-plate, O, secured to the under side of the car-body at right angles to guide-plate J, the conducting-pipe passing through the slot in plate O, as seen in Fig. 1. The forward end of spring N rests loosely against the rear side of the front wall of box M.

P represents a spring-seat for the sliding box M. It consists simply of two rods, 25, each hooked at the upper end and provided at the lower end with a head, 26. A metal plate, 27, having an elongated hole, 28, at each end, rests on the heads 26 of the rods, and above this plate, encircling each rod, is a spiral spring, 29, on the upper ends of which rests another plate, 30, having elongated holes 31, similar to those in plate 27. These rods are hooked into rings (not seen) secured to the under side of the beam of the platform.

It is to be understood that there are to be a male coupling on one side of the car and a female coupling on the other side at each end, the male coupling on one end being opposite the female coupling at the other end.

The operation is as follows: While the cars are out of use the pipe-couplings should be drawn in under the platforms by means of the winding-shafts and chains and kept there until the cars are coupled in the train. When the cars have been coupled, the pawls on the abutting cars are disengaged from the ratchets on the winding-shafts, when the propelling-springs will force the pipe-couplings together. The male coupling will enter the female coupling until the valve stem of the latter strikes the valve-face of the former, (when said stem will be centrally directed by the concavity in the valve-face of the male pipe-coupling,) and as the pipe-couplings continue to move toward each other their valves will be simultaneously and evenly opened, (assuming of course that the springs in both couplings are of the same strength,) the forward end of the male coupling resting against the face of the valve in the female coupling when the valves are at full throw. The heating-current will then flow through the notches in the periphery of the valve in the female coupling and through the notches in the end of the male coupling and the notches in the periphery of the valve of said coupling, or vice versa. If the valves in the two pipe-couplings open evenly, the telescopic movement of the male and female couplings will be arrested by the beveled end of the former impinging against the beveled inner portion of the latter by the time the valves are at full throw. On the other hand, should the spring in the male coupling be so strong as to hold its valve closed and at the same time overcome the spring in the female coupling, the impinging-point of the two couplings will not be reached until after the valve in the female coupling shall have been forced back against the shoulder 14 in that coupling, and as the propelling-springs N continue to force the pipe-couplings together until said impigning-point is reached, the spring in the male coupling will in the mean time be compressed and the valve opened. When the cars are in motion and while they are oscillating laterally and vertically with relation to each other, the pipe-couplings, and consequently the conducting-pipes I, maintain the same axial relation one to the other, as clearly shown in the diagrams, Figs. 11 and 12, this unitary movement of the pipe-couplings being due to the propelling-springs N, (not shown in the diagrams,) pipe-sections E F G, guide-plates J and O, spring-seats P, and elbow-pipes H. Should adjoining cars swing laterally in opposite directions, the conducting-pipes I would assume the position shown in dotted lines, Fig. 11, their movement into those positions being permitted by the pipe-sections on one car spreading apart from each other, and the sections on the other car closing in toward each other, as also shown in dotted lines in said figure, it being understood that in this case the slotted guide-plates O serve as fulcrums to change direction of the inner ends of conducting-pipes I, as seen in Fig. 14. As the conducting-pipes I are screwed into the sliding boxes M, to which the pipe-couplings are bolted, it follows that they, (the boxes,) and consequently the pipe-couplings, will assume the position of the conducting-pipes, whatever that position may be, the boxes turning slightly on the spring-seats P. The plates 27 and 30 of these seats, however, maintain their original positions owing to the weight upon them, while their supporting-rods 25, hooked to the under side of the platform-beams, play back and forth freely in the elongated holes 28 and 31 in said plates, respectively. Should the cars separate slightly, the propelling-springs N will still continue to press the pipe-couplings together with sufficient force to maintain a close joint, they being made of sufficient length and power to meet this requirement. Likewise, in the vertical oscillations of the cars the pipe-couplings and also the conducting-pipes maintain the same axial relation to each other. For example, let us suppose that one car moves downward, as illustrated by the dotted lines on the right of the diagram Fig. 12, and that the other car moves upward, as seen in dotted lines on the left of said figure. Now, it will be observed that as the one car is depressed the rear end of the conducting-pipe I is correspondingly depressed and turns on the elbow H, the pipe-sections E F G and elbow H maintaining their original position with relation to each other. As the rods 25 of the spring-seat P are depressed the springs 29 expand and force the bottom plate, 27, down; but the top plate, 30, is held up by the said springs to near its original position, it being slightly depressed, however, by the tilting of the sliding box M and its attached pipe-coupling in assuming the angle of the conducting-pipe I, as seen in dotted lines. In this particular instance the slotted guide-plate J has no other function than as a support for pipe-section G. On the contrary, as the other car rises its conducting-pipe I, in assuming an angle corresponding to that of the conducting-pipe on the other car, would have a tendency to tilt the pipe-sections and possibly injure their joints; but as section G cannot be tilted by the conducting-pipe by reason of the slotted guide-plate J holding it down, the conducting-pipe is forced to turn on its joint at elbow H. The rods 25 of spring-seat P will of course be drawn upward, thus compressing springs 29 between the plates 27 and 30. As the conducting-pipe tilts downward, the sliding box M will also tilt, and as a consequence the plate 30 will rise slightly, as seen in dotted lines. When connection has been made with the source of steam or hot air, the heating agent passes along the sides of the car and under the seats through the main pipes A until it reaches the three-way joints D, when, if the valves D' are set so that the "cut-out" portion uncovers the horizontal portion of the main pipes and the pipe-sections E, the steam or hot air will pass through the sections E F G, elbow H, conducting-pipes I, and the pipe-couplings into the adjoining car, where it will be distributed in like manner. The valves D' in the three-way joints D at the rear end of the last car in the train should be set so as to close pipe-sections E and open communication throughout the main pipes, and then when valves a and a' are open the steam will escape. There being no object in letting hot air escape, the valve a' may be closed, thus allowing the current of hot air to pass entirely around the train. Hot air may be used on one side of the train and steam on the other by simply keeping the valve a on the hot-air side closed and opening valve a on the steam side and valve a' in the escape-pipe.

The peculiar arrangement of the system of heating-pipes within the car is not claimed herein, as such subject-matter is reserved for another application.

Having thus described our invention, what we claim as new, and desire to secure by Letters Patent, is—

1. The combination, with the main pipes, of the male and female couplings, sliding boxes to which said couplings are secured, spring-seats for the support of the boxes, conducting-pipes whose forward ends are secured in the boxes and communicate with the couplings, springs encircling the conducting-pipes and adapted to advance the couplings, and flexible connections between the conducting-pipes and main pipes, substantially as described.

2. The combination, with the main pipes, of the male and female couplings, sliding boxes to which said couplings are secured, spring-seats for the support of said boxes, rigid conducting-pipes whose forward ends are secured in the boxes and communicate with the couplings, springs encircling the conducting-pipes and bearing at their front ends against the boxes, the vertically-slotted guide-plates, through which the conducting-pipes pass and against which the rear ends of the propelling-springs are seated, and flexibly-jointed pipe-sections and pipe-elbows connecting the conducting-pipes with the main pipes, substantially as described.

3. The combination, with the main pipes, of the male and female couplings, sliding boxes to which said couplings are secured, swinging spring-seats for said boxes, rigid conducting-pipes whose forward ends are secured in the boxes and communicate with the couplings, springs encircling the conducting-pipes and bearing at their front ends against the boxes, the vertically-slotted guide-plates, through which the conducting-pipes pass and against which the rear ends of the propelling-springs are seated, the pipe-sections and pipe-elbows, and the horizontally-slotted guide-plates for governing the movements of the pipe-sections with relation to the elbows, substantially as described.

4. The combination, with the main pipes, of the male and female couplings, sliding boxes to which said couplings are secured, spring-seats for the support of the boxes, conducting-pipes whose forward ends are secured in the boxes and communicate with the couplings, springs encircling the conducting-pipes and adapted to advance the couplings, flexible connections between the conducting-pipes and main pipes, and the chains, pulleys, and winding-shaft, said chains being attached to the sliding boxes, passed over the pulleys, and also attached to the winding-shaft, for the purpose set forth.

In testimony whereof we affix our signatures in presence of two witnesses.

WILLIAM L. VAN HARLINGEN, Sr.
WILLIAM L. VAN HARLINGEN, Jr.

Witnesses:
ALBERT SPEIDEN,
G. W. BALLOCH.